United States Patent
Yang

(10) Patent No.: US 11,176,438 B2
(45) Date of Patent: Nov. 16, 2021

(54) NEURAL NETWORK SYSTEM, APPLICATION PROCESSOR HAVING THE SAME, AND METHOD OF OPERATING THE NEURAL NETWORK SYSTEM

(71) Applicant: SAMSUNG ELECTRONICS CO., LTD., Suwon-si (KR)

(72) Inventor: Seung-soo Yang, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 510 days.

(21) Appl. No.: 16/229,146

(22) Filed: Dec. 21, 2018

(65) Prior Publication Data

US 2019/0370630 A1 Dec. 5, 2019

(30) Foreign Application Priority Data

May 30, 2018 (KR) .................. 10-2018-0062130

(51) Int. Cl.
*G06N 3/02* (2006.01)
(52) U.S. Cl.
CPC ..................... *G06N 3/02* (2013.01)
(58) Field of Classification Search
CPC ...................................................... G06N 3/02
See application file for complete search history.

(56) References Cited

U.S. PATENT DOCUMENTS

| | | | |
|---|---|---|---|
| 7,219,085 B2 | 5/2007 | Buck et al. | |
| 7,447,664 B2 * | 11/2008 | Pado | G05B 13/027 706/15 |
| 8,122,398 B2 | 2/2012 | Veller et al. | |
| 8,712,941 B2 | 4/2014 | Izhikevich et al. | |
| 8,719,742 B2 | 5/2014 | Veller et al. | |
| 8,983,883 B2 | 3/2015 | Sterritt et al. | |
| 9,195,233 B2 | 11/2015 | Perrone | |
| 9,704,094 B2 | 7/2017 | Amir et al. | |
| 9,792,397 B1 | 10/2017 | Nagaraja | |
| 9,836,888 B2 | 12/2017 | Skidmore | |
| 2017/0039472 A1 | 2/2017 | Kudo | |
| 2017/0061277 A1 | 3/2017 | Esser et al. | |
| 2017/0068889 A1 | 3/2017 | Fougner et al. | |
| 2017/0169332 A1 | 6/2017 | Graves et al. | |
| 2017/0228643 A1 | 8/2017 | Kurach et al. | |

(Continued)

*Primary Examiner* — Olisa Anwah
(74) *Attorney, Agent, or Firm* — Sughrue Mion, PLLC

(57) ABSTRACT

Provided are a neural network system, an application processor including the same, and a method of operating the neural network system. The neural network system includes an operation allocating manager configured to divide a request including a plurality of operations for neural network processing into a plurality of sub-requests each including at least one operation, allocate the plurality of sub-requests to dedicated hardware and one or more pieces of general-purpose hardware, and allocate memories for input and output for each of the plurality of sub-requests based on cost information indicating respective costs needed for hardware to access the memories; and a neural network device configured to execute the sub-requests by using the dedicated hardware and the one or more pieces of general-purpose hardware according to a result of the operation allocation. The operation allocating manager allocates different memories to at least two sub-requests of the plurality of sub-requests.

20 Claims, 14 Drawing Sheets

(56) References Cited

U.S. PATENT DOCUMENTS

2017/0316312 A1 11/2017 Goyal et al.
2017/0344882 A1 11/2017 Ambrose et al.
2018/0285011 A1* 10/2018 Ma ....................... G06F 9/4881

* cited by examiner

- CPU
    - (GPU, 0), (system cache, 1), (dram, 3)
- GPU
    - (CPU, 0), (system cache, 1), (hbm, 2), (dram, 3)
- NPU
    - (DSP, 0), (sram, 1), (dram, 3)
- DSP
    - (NPU, 0), (sram, 1)

NEURAL NETWORK SYSTEM, APPLICATION PROCESSOR HAVING THE SAME, AND METHOD OF OPERATING THE NEURAL NETWORK SYSTEM

This application claims priority from Korean Patent Application No. 10-2018-0062130, filed on May 30, 2018 in the Korean Intellectual Property Office, the disclosure of which is incorporated herein in its entirety by reference.

BACKGROUND

Apparatuses and methods consistent with embodiments relate to a neural network system, and more particularly, to a neural network system with improved operation efficiency, an application processor including the neural network system, and a method of operating the neural network system.

A neural network refers to a computational architecture that is modeled after a biological brain. Recently, as neural network technology has been developed, research is being actively made for analyzing input data and extracting valid information by using neural network devices using one or more neural network models in various types of electronic systems.

There are various types of neural networks, such as deep learning algorithms, and each neural network may perform various types of operations. Here, dedicated hardware is being developed to accelerate operation speed. However, some of the various types of operations may not be supported by the dedicated hardware, and thus the processing performance of a neural network may be degraded.

SUMMARY

Provided are a neural network system capable of improving the operation efficiency of neural network models, an application processor including the neural network system, and a method of operating the neural network system.

According to an aspect of an embodiment, there is provided a neural network system including an operation allocating manager configured to divide a request including a plurality of operations for neural network processing into a plurality of sub-requests each including at least one operation, allocate the plurality of sub-requests to dedicated hardware and one or more pieces of general-purpose hardware, and allocate memories for input and output for each of the plurality of sub-requests based on cost information indicating respective costs needed for the dedicated hardware and the one or more pieces of general-purpose hardware to access the memories; and a neural network device configured to execute the plurality of sub-requests by using the dedicated hardware and the one or more pieces of general-purpose hardware according to a result of the allocating the plurality of sub-requests and the allocating the memories by the operation allocating manager. The operation allocating manager may be further configured to allocate different memories to at least two sub-requests of the plurality of sub-requests.

According to another aspect of an embodiment, there is provided a method of operating a neural network system. The method may include dividing, via a processor, a request including a plurality of operations for neural network processing into a plurality of sub-requests each including at least one operation; allocating, via the processor, a first group of operations of the plurality of sub-requests to dedicated hardware, the first group of operations being executable by the dedicated hardware; allocating, via the processor, a second group of operations of the plurality of sub-requests to one or more pieces of general-purpose hardware; allocating, via the processor, memories to the plurality of sub-requests based on cost information indicating respective costs needed for the dedicated hardware and the one or more pieces of general-purpose hardware to access the memories; and executing the plurality of sub-requests by accessing the allocated memories by the dedicated hardware and the selected general-purpose hardware.

According to another aspect of an embodiment, there is provided an application processor including a memory configured to store a program; a processor configured to execute the program stored in the memory; and an operation allocating manager including the program loadable into the memory. The processor may be further configured to, by executing the operation allocating manager, divide a request including a plurality of operations for neural network processing into a plurality of sub-requests each including at least one operation, select dedicated hardware and one or more pieces of general-purpose hardware for executing the plurality of sub-requests, and allocate memories to the plurality of sub-requests based on cost information indicating respective costs for the dedicated hardware and the one or more pieces of general-purpose hardware to access the memories.

BRIEF DESCRIPTION OF THE DRAWINGS

The above and/or other aspects will be more clearly understood from the following detailed description taken in conjunction with the accompanying drawings in which.

DETAILED DESCRIPTION

Figure 1:
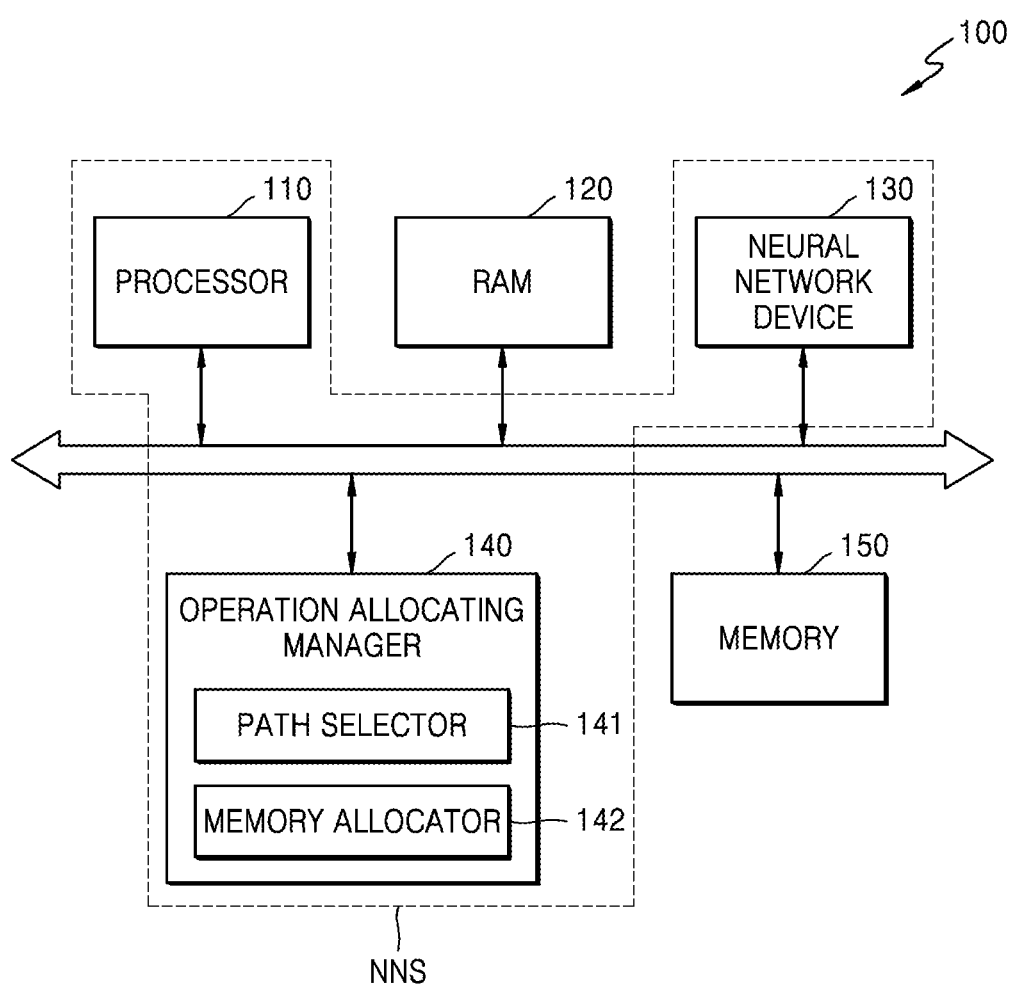
FIG. 1 is a block diagram showing an electronic system including an operation allocating manager according to an embodiment.

Reference will now be made in detail to embodiments, with reference to the accompanying drawings. In the drawings, parts irrelevant to the description are omitted to clearly describe the exemplary embodiments, and like reference numerals refer to like elements throughout the specification. In this regard, the present embodiments may have different forms and should not be construed as being limited to the descriptions set forth herein.

Throughout the specification, when it is described that a certain element is "connected" to another element, it should be understood that the certain element may be "directly connected" to another element or "electrically connected" to another element via another element in the middle. In addition, when a component "includes" an element, unless there is another opposite description thereto, it should be understood that the component does not exclude another element but may further include another element.

As used herein, the term "and/or" includes any and all combinations of one or more of the associated listed items. Expressions such as "at least one of," when preceding a list of elements, modify the entire list of elements and do not modify the individual elements of the list. Each of the components, units, modules, etc. illustrated in the drawings may be implemented with software (e.g., code, instructions, programs, applications, firmware, etc.), hardware (e.g., circuits, microchips, processors, etc.), or a combination of both software and hardware.

It will be apparent that though the terms "first," "second," "third," etc. may be used herein to describe various members, components, regions, layers, and/or sections, these members, components, regions, layers, and/or sections should not be limited by these terms. These terms are only used to distinguish one member, component, region, layer, or section from another region, layer, or section, and do not necessarily imply order or priority unless stated otherwise. Thus, a first member, component, region, layer, or section discussed below could be termed a second member, component, region, layer, or section without departing from the teachings of the embodiments.

Hereinafter, the present disclosure is described in detail with reference to the accompanying drawings.

FIG. 1 is a block diagram showing an electronic system including an operation allocating manager, according to an embodiment. According to an embodiment, an electronic system 100 of FIG. 1 may extract valid information by analyzing input data in real time based on a neural network and determine a situation based on the extracted information or may control configurations of a system like a mobile device employing the electronic system 100.

The electronic system 100 of FIG. 1 may be an application processor (AP) employed in a mobile device. Alternatively, the electronic system 100 of FIG. 1 may correspond to a computing system, a robotic device like a drone and an advanced drivers assistance system (ADAS), a smart TV, a smart phone, a medical device, a mobile device, an image display device, a measuring device, and/or an Internet of Things (IoT) device. Furthermore, an operation allocating manager according to an embodiment may be applied to various systems. Hereinafter, it is assumed that the electronic system 100 of FIG. 1 corresponds to an AP.

Referring to FIG. 1, the electronic system 100 may include a processor 110, random access memory (RAM) 120, a neural network device 130, an operation allocating manager 140, and a memory 150. According to an embodiment, all or at least some of the components of the electronic system 100 may be mounted on one semiconductor chip. Also, according to an embodiment, the operation allocating manager 140 may be defined as a component within the neural network device 130. The various components, devices, units, etc. illustrated in FIG. 1 and other drawings may be implemented with hardware (e.g., circuits, microchips, processors, etc.), software (e.g., code, instructions, programs, applications, firmware, etc.), or a combination of both hardware and software.

Since the electronic system 100 processes a neural network, the electronic system 100 may be defined as including a neutral network system (NNS). The NNS may include at least some of the components provided in the electronic system 100 in connection with neural network operations. For example, although FIG. 1 shows that the NNS includes the processor 110, the neural network device 130, and the operation allocating manager 140, embodiments of the present disclosure need not be limited thereto. For example, other various types of configurations related to neural network operations may be provided in the NNS.

The processor 110 may control the overall operation of the electronic system 100. For example, the processor 110 may be a central processing unit (CPU). The processor 110 may include one processor core or a plurality of processor cores (multi-core). The processor 110 may process or execute programs and/or data stored in the RAM 120 and the memory 150. According to an embodiment, the processor 110 may control the functions of the neural network device 130 by executing programs stored in the memory 150.

The RAM 120 may temporarily store programs, data, or instructions. For example, programs and/or data stored in the memory 150 may be temporarily loaded to the RAM 120 according to the control of the processor 110 or a booting code. The RAM 120 may be implemented with memory devices such as dynamic RAM (DRAM) or static RAM (SRAM).

The neural network device 130 may perform an operation of a neural network based on received input data and may generate an information signal based on a result of the operation. Neural network models may include, but are not limited to, various models like a convolution neural network (CNN) (e.g., GoogLeNet, AlexNet, Visual Geometry Group (VGG) Network, etc.), a region with convolution neural network (R-CNN), a region proposal network (RPN), a recurrent neural network (RNN), a stacking-based deep neural network (S-DNN), a state-space dynamic neural network (S-SDNN), a deconvolution network, a deep belief network (DBN), a restricted Boltzman machine (RBM), a fully convolutional network, a long short-term memory (LSTM) network, and a classification network. The neural network device 130 may include one or more processors (e.g., dedicated hardware) to perform operations according to neural network models. The neural network device 130 may also include a separate memory for storing programs and algorithms corresponding to neural network models.

The information signal may include one of various types of recognition signals like a speech recognition signal, an object recognition signal, an image recognition signal, and a biometric information recognition signal. For example, the neural network device 130 may receive frame data included in a video stream as input data and generate a recognition signal for an object included in an image indicated by the frame data from the frame data. However, the inventive concept is not limited thereto. Depending on types or functions of an electronic device having been installed on the electronic system 100, the neural network device 130 may receive various types of input data and generate information signals according to the input data.

Neural network operations may be performed by various types of hardware (or processors), e.g., general-purpose hardware or dedicated hardware optimized for particular software. For example, various types of neural network models may be executed by general-purpose hardware like a CPU or a graphics processing unit (GPU), but operation characteristics for performance or power consumption may be lower than those of dedicated hardware. Furthermore, when a particular neural network model is executed by dedicated hardware (e.g., an ASIC, a neural processing unit (NPU), a tensor processing unit (TPU), a neural engine, etc.), performance and power consumption may be relatively efficient. However, since dedicated hardware does not support some type of operations, there may be difficulties for executing various types of neural network models. In this disclosure, the term "dedicated hardware" may refer to a special-purpose hardware device that is specifically designed to perform one or a handful of functions. On the other hand, "general-purpose hardware" may be deployed in a wide variety of systems to perform a wide variety of tasks. However, there may be an overlap between the tasks that may be performed by dedicated hardware and the tasks that may be performed by general-purpose hardware although, even in these cases, the dedicated hardware may outperform the general-purpose hardware in tasks that the dedicated hardware was specifically designed for.

For example, due to various factors, such as an input feature map size, a filter size, and data characteristics, a neural network may include operations that may not be accelerated by dedicated hardware. Therefore, the processing efficiency of a neural network using dedicated hardware is limited. Furthermore, operations that may not be accelerated by dedicated hardware need to be executed by other general-purpose hardware. In such a process, a plurality of memory copying operations may occur while results of operations by the dedicated hardware are being stored in a particular memory and results of operations stored in the memory are being transferred to the general-purpose hardware. For example, since data characteristics processed by dedicated hardware are different from data characteristics processed by general-purpose hardware, additional processes for converting characteristics, such as a data layout, a quantization algorithm, and a compression algorithm, are additionally performed. The additional processes may cause a plurality of memory copying operations, thereby degrading the operation speed of a neural network.

According to an embodiment, the operation allocating manager 140 may manage an operation for assigning operations of a neural network to a plurality of pieces of hardware. For example, the operation allocating manager 140 may receive a request including a plurality of operations of a neural network via a hardware abstraction layer (HAL) of an operating system or a system and, after the request is divided into a plurality of sub-requests, may allocate the sub-requests to a plurality of pieces of hardware including dedicated hardware and general-purpose hardware. In other words, one sub-request may include one or more operations, and each piece of hardware may perform operation(s) of a sub-request assigned thereto.

According to an embodiment, the operation allocating manager 140 may include a path selector 141 and a memory allocator 142. The path selector 141 may select hardware to execute each sub-request for a neural network demanded by an application executed by the electronic system 100. The operation may be defined as an operation for selecting a path to provide sub-requests to a plurality of pieces of hardware. For example, in the case of performing operations of the neural network through particular dedicated hardware like an NPU, the operation for selecting a path may be performed, such that operations (e.g., operations of a first group) executable by the dedicated hardware may be allocated to the dedicated hardware and operations (e.g., operations of a second group) that are not executable by the dedicated hardware may be allocated to general-purpose hardware like a CPU or a GPU.

For example, the request for execution of the neural network may include first to M-th operations to be sequentially executed, and, from among the first to M-th operations, A to B operations (where A and B are integers less than M) correspond to operations of the second group that may not be performed by the dedicated hardware, the request may be divided into a first sub-request including first to (A−1)-th operations, a second sub-request including the A to B operations, and a third sub-request including (B+1)-th to M-th operations. At this time, based on the operation for selecting a path, the first sub-request may be executed by the dedicated hardware, the second sub-request may be executed by the general-purpose hardware, and the third sub-request may be executed by the dedicated hardware.

On the other hand, the memory allocator 142 may allocate memories used for executing sub-requests to corresponding sub-requests. For example, the memory allocator 142 may generate information indicating a memory in which the input of each sub-request is stored and a memory in which the output of each sub-request is to be stored.

The operation allocating manager 140 may be implemented by hardware or software. The path selector 141 and the memory allocator 142 included in the operation allocating manager 140 may also be implemented by hardware or software. When the path selector 141 and the memory allocator 142 are implemented by software, each of the path selector 141 and the memory allocator 142 may be a storage circuit for storing instructions, and the instructions may be loaded on the RAM 120. On the other hand, when the path selector 141 and the memory allocator 142 are implemented by hardware, each of the path selector 141 and the memory allocator 142 may include circuits that receive a predetermined input signal (various pieces of information) and perform operations. For example, the path selector 141 may include circuits that receive various pieces of information related to hardware performing a subrequest and perform operations, and output a signal indicating general hardware to perform the sub-request. Likewise, the memory allocator 142 may include circuits that perform operations regarding various pieces of cost information of memories, for example, information included in link information, and output signals to indicate memories to be allocated. Furthermore, although FIG. 1 illustrates the operation allocating manager 140 as a separated element, the operation allocating manager 140 may be implemented at various locations within the SoC. For instance, the operation allocating manager 140 may be disposed in the neural network device 130.

According to an embodiment, a system including the electronic system 100 may include various types of memories other than the memory 150 shown in FIG. 1. Here, when the dedicated hardware stores a result of the first sub-request and the result is read out by general-purpose hardware, a memory cost may occur, and the memory cost may occur differently for each of a plurality of memories include in a system employing the electronic system 100. At this time, the memory allocator 142 may select a memory exhibiting a smallest or relatively small memory cost (e.g., a cost below a predetermined threshold) for transferring results of operations by dedicated hardware to general-purpose hardware and allocate the memory to the first sub-request.

Alternatively, an operation for allocating a memory may be performed in various manners. For example, when a plurality of sub-requests are executed in series, a memory cost may occur during a process for storing results of operations, memory costs may occur during a process for reading the results of the operations, and an operation for allocating a memory may be performed by selectively taking any one of the memory costs during the processes for storing and reading results of operations into account.

Alternatively, as a modified embodiment, the second sub-request described above may be executed by general-purpose hardware, and the system including the electronic system 100 may include various types of general-purpose hardware other than the processor 110 shown in FIG. 1. At this time, the path selector 141 may receive memory cost information about the various general-purpose hardware and may select general-purpose hardware to which a sub-request is to be allocated based on the memory cost information. In other words, after general-purpose hardware to execute a sub-request is selected, a memory from among a plurality of memories that may be accessed by the selected general-purpose hardware may be allocated based on a memory cost, or general-purpose hardware to execute the sub-request may be selected from among pieces of general-purpose hardware capable of exchanging results of operations with dedicated hardware with a relatively small memory cost. According to the various schemes as described above, degradation of an operation processing performance may be reduced or minimized by allocating operations of a neural network operation to two or more pieces of hardware.

On the other hand, a memory cost may include various types of factors related to memory operations. For example, the memory allocator 142 may allocate a memory exhibiting the lowest memory cost from among a plurality of memories to each sub-request, and a memory cost may include at least one of a memory size, write/read latencies, a bandwidth, and power consumption.

According to embodiments as described above, an NNS may notify a system that all operations of a neural network may be accelerated. Therefore, the NNS may manage overall operations of the neural network operation without an operation allocation process performed by an operating system. Furthermore, inputs and outputs of results of operations may be connected via data sharing without performing a plurality of memory copying operations for processing operations with different types of hardware. Also, pipeline processing of operations may be performed for improved processing performance of a neural network.

Meanwhile, the operation allocating manager 140 may be implemented in various forms. According to an embodiment, the operation allocating manager 140 may be implemented as hardware or software. When the operation allocating manager 140 is implemented as hardware, the operation allocating manager 140 may include circuits (e.g., a semiconductor chip, a microchip, a processor, etc.) for hardware-wise reception of information for operation path selection and memory allocation and signal processing in relation to the information. Alternatively, the operation allocating manager 140 may be implemented as software and, as the operation allocating manager 140 is loaded into the RAM 120 and executed by the processor 110, the above-described operations for selecting an operation path and allocating memories may be performed. In other words, the above-described operation for managing operation allocation may be described as being performed by executing a program included in the operation allocating manager 140 by the processor 110.

Meanwhile, when the electronic system 100 shown in FIG. 1 corresponds to an application processor, a system in which the electronic system 100 is employed may further include one or more pieces of general-purpose hardware and additional dedicated hardware, and a plurality of sub-requests may be allocated to hardware inside and outside the electronic system 100. In the below descriptions of operations of a system of a neural network according to embodiments, a component referred to as hardware may be a term including general-purpose hardware and dedicated hardware.

Figure 2:
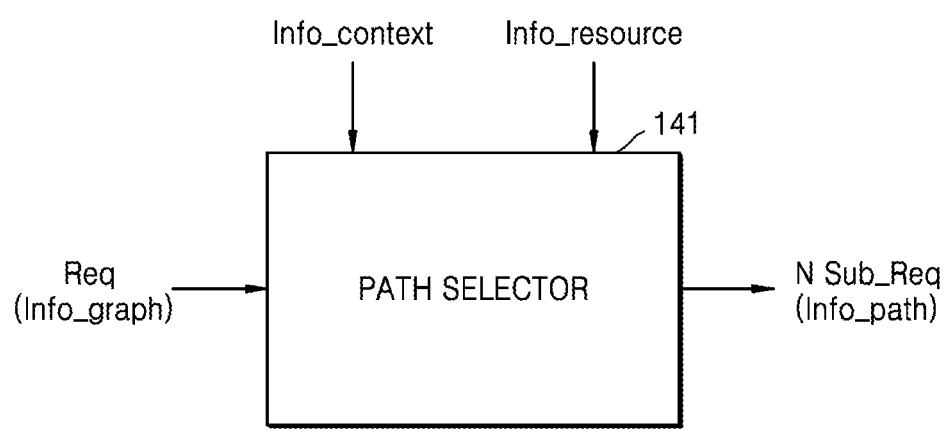
FIG. 2 is a block diagram showing an of operation of a path selector of FIG. 1.

FIG. 2 is a block diagram showing an of operation of the path selector 141 of FIG. 1.

Referring to FIGS. 1 and 2, the path selector 141 may receive a request Req requested in a neural network operation and divide the same into N sub-requests sub_Req. The reception of the request Req by the path selector 141 may be described as reception of information about a plurality of operations included in the request Req. For example, information Info_graph including a graph indicating an overall operation obtained through an analysis of a neural network may be received.

The path selector 141 may divide the request Req into N sub-requests N sub_Req based on various types of information. For example, the path selector 141 may perform the dividing operation based on information Info_graph, which is a result of an analysis on the neural network, together with static information and dynamic information about a plurality of pieces of hardware for executing neural network operations. For an example, the static information may include computing resource information Info_resource, such as performance and characteristics of hardware for executing neural network operations. Furthermore, the dynamic information includes various types of information that may be generated during execution of a neural network operation, e.g., computing context information Info_context during a runtime process. The path selector 141 may select general-purpose hardware and dedicated hardware to execute the N sub-requests N sub_Req based on various types of information as described above and, according to a result of the selection, generate path information Info_path indicating the hardware to which sub-requests are to be provided.

For example, the request Req may correspond to a request for execution of an operation by dedicated hardware provided by a system, the request Req may include operations that may not be executed by the dedicated hardware, and one or more pieces of general-purpose hardware for executing operations that may not be executed by the dedicated hardware may be selected by the path selector 141.

Figure 3:
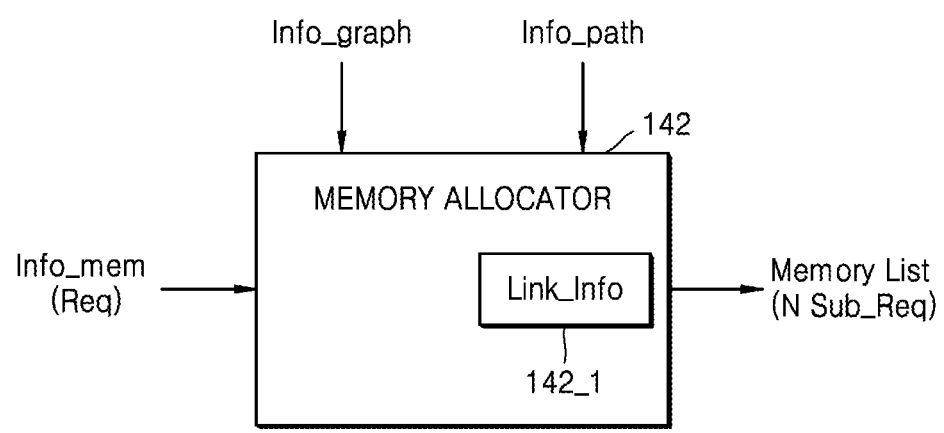
FIG. 3 is a block diagram showing an of operation of a memory allocator of FIG. 1.

FIG. 3 is a block diagram showing an of operation of the memory allocator 142 of FIG. 1.

Referring to FIGS. 1 and 3, the memory allocator 142 may allocate memories to the respective sub-requests N sub_Req by using the information Info_graph obtained by analyzing a neural network and path information Info_path. For example, the memory allocator 142 may generate memory information for inputting and outputting the respective sub-requests sub_Req from memory information Info_mem, based on the above-stated information. The information generated by the memory allocator 142 may be referred to as a memory list, because the information indicates memories allocated to the sub-requests sub_Req.

According to an embodiment, assuming that dedicated hardware executes a first sub-request and general-purpose hardware executes a second sub-request, the dedicated hardware refers to the memory list, and thus the dedicated hardware may store a result of executing the first sub-request in a memory designated by the memory list. Furthermore, the general-purpose hardware may determine memories designated for inputting and outputting a second sub-request based on the memory list, read a result of executing the first sub-request to execute the second sub-request, and store a result of executing the second sub-request in a memory designated by the memory list.

According to an embodiment, the memory allocator 142 may store link information (Link_Info) 142_1, and the Link_Info 142_1 may include information about memory costs of respective pieces of hardware for accessing various types of memories. For example, each piece of hardware may be linked to various types of memories and perform an access operation, where the memory performance for accessing the various types of memories may vary. For example, the smaller the latency in an access operation is, the better the operation performance may be. A memory cost for accessing a memory with a low latency may be relatively small, whereas a memory cost for accessing a memory with a high latency may be relatively large. The memory allocator 142 may refer to the Link_Info 142_1 regarding hardware for executing the respective sub-requests N Sub_Req for allocating memories to the respective sub-requests N sub_req and may select and allocate memories optimized to the respective sub-requests N Sub-Req.

According to a neural network system according to an embodiment described above, neural network operations may be optimized and executed based on neural network information, and a system recognizes that dedicated hardware is capable of accelerating all operations of a neural network. Furthermore, performance degradation due to a memory copying operation may be minimized even when operations of a neural network are executed with a combination of general-purpose hardware and dedicated hardware.

Figure 4:
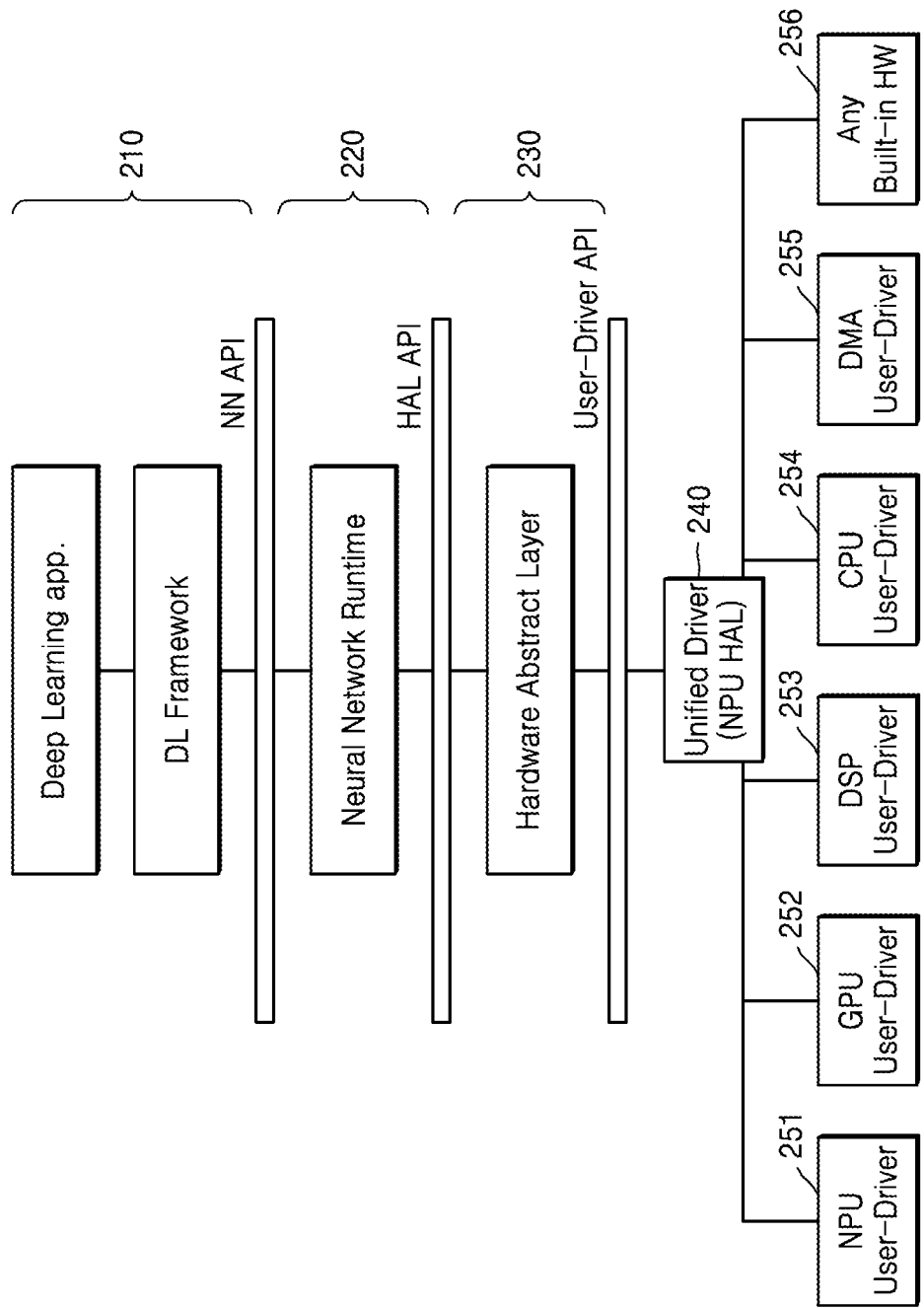
FIG. 4 is a schematic diagram showing an embodiment of an electronic system including a neural network system according to an embodiment.

FIG. 4 is a schematic diagram showing an embodiment of an electronic system including a neural network system according to an embodiment. FIG. 4 exemplifies a software architecture employed by an electronic system 200 for execution of a neural network system and the Android platform is shown as an thereof. However, embodiments are not limited to a particular type of platform. For example, embodiments may also be applied to an electronic system operated by other operating systems such as Apple's iOS, the Blackberry OS by RIM, or Microsoft Windows.

The software architecture for operating a neural network system may include an application level 210 and system levels 220 and 230. Furthermore, the electronic system 200 may include an integrated driver 240 for managing allocation of operations according to the embodiments described above and user drivers 251 through 256 for driving various types of hardware included in the electronic system 200. The software architecture of the electronic system 200 may determine that dedicated hardware (e.g., an NPU) operated by the integrated driver 240 performs the overall operations of a neural network, and thus the integrated driver 240 may also be referred to as an NPU hardware abstraction layer (HAL). The HAL of a system level 230 may provide a request for neural network operations to the integrated driver 240 through a user driver API.

Referring to FIG. 4, the application level 210 may include a deep learning application as an application for issuing a request based on a neural network and may also include a deep learning framework providing an interface between the deep learning application and a level therebelow through a neural network API (NN API). The system levels 220 and 230 may also be used to execute a deep running application on a neural network runtime through one or more virtual machines (VMs), and the HALs of the system levels 220 and 230 may provide hardware interfaces through a user driver API.

Meanwhile, the integrated driver 240 may provide a common interface to user drivers 251 through 256 arranged in correspondence to various types of hardware. Furthermore, the integrated driver 240 may employ the operation allocation management function described in the above-described embodiment, may divide a neural network-based request into a plurality of sub-requests based on the operation allocation management operation, and may also schedule execution of the sub-requests by allocating the sub-requests to at least two pieces of hardware via the user drivers 251 through 256.

Each of the user drivers 251 through 256 controls the actual operation of corresponding hardware. FIG. 4 exemplifies an NPU user driver 251, a GPU user driver 252, a digital signal processor (DSP) user driver 253, a driver 254, a direct memory access (DMA) user driver 255, and a user driver 256 for other hardware. However, embodiments are not limited thereto. The electronic system 200 may include additional drivers for managing various types of hardware like a direct memory access (DMA) driver for performing an operation function and a multimedia driver for managing various other types of hardware. The additional drivers may be further managed by the integrated driver 240.

Figure 5:
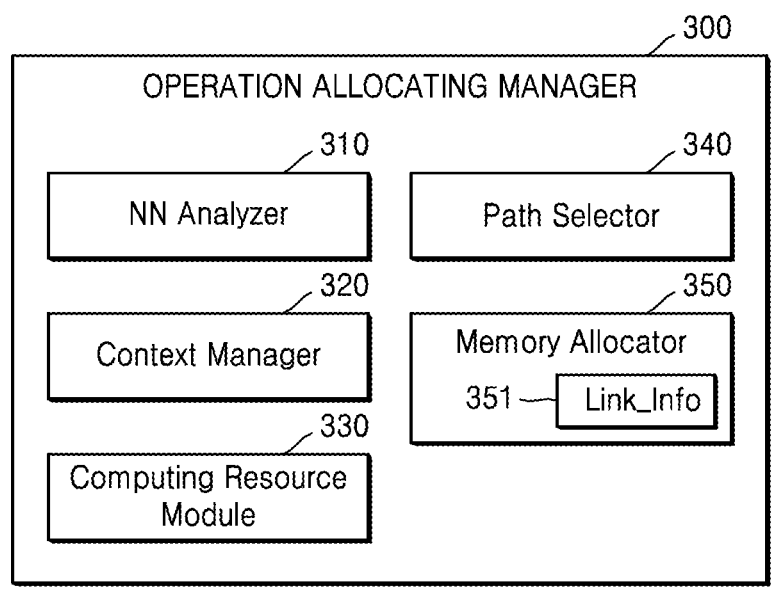
FIG. 5 is a block diagram showing an of a configuration of an operation allocating manager according to an embodiment.

FIG. 5 is a block diagram showing an of a configuration of an operation allocating manager according to an embodiment.

Referring to FIG. 5, an operation allocating manager 300 may include a neural network analyzer 310, a context manager 320, a computing resource module 330, a path selector 340, and a memory allocator 350. Furthermore, the memory allocator 350 may include Link_Info 351 having memory cost information regarding memories of respective pieces of hardware.

The neural network analyzer 310 may analyze information about all operations included in an input neural network and analyze the type of an operation that may be performed by each piece of hardware. For example, the neural network analyzer 310 may generate operation graph information including information about the overall operation structure of an input neural network and information indicating hardware capable of supporting the operation.

The path selector 340 may divide a request including a plurality of operations for processing a neural network into a plurality of sub-requests based on a result of an analysis from the neural network analyzer 310 and select a plurality of pieces of hardware for executing the sub-requests. Since the path selector 340 allocates hardware for executing operations, the path selector 340 may be described as performing a resource management function.

For example, the path selector 340 may determine operations that are executable by dedicated hardware (operations of a first group) and operations that are not executable by the dedicated hardware (operations of a second group) based on computing resource information Info_resource and computing context information Info_context along with a result of an analysis by the neural network analyzer 310 and may divide a request into sub-requests based on a result of the determination. The path selector 340 may also allocate a sub-request including the operations of the first group to the dedicated hardware and select one or more pieces of hardware to allocate thereto a sub-request including the operations of the second group not supported by the dedicated hardware. Furthermore, during an operation for allocation to hardware, hardware optimized for performing the sub-requests may be selected from among a plurality of pieces of hardware based on the computing resource information Info_resource and the computing context information Info_context.

The context manager 320 may generate the above-described computing context information Info_context, and the computing resource module 330 may generate the computing resource information Info_resource. As in the embodiment described above, the computing resource information Info_resource is static information related to various hardware and may include operation method information like convolution/addition/maximum values, kernel structure information, data flow information, and various types of information about hardware efficiency and capacity like power consumption. Furthermore, the computing context information Info_context is dynamic information related to resources and may include various types of information like variations of computing resource states, power/temperature information, bus/memory/storage states, application types, and application lifecycles. The context manager 320 and the computing resource module 330 may provide the various types of information described above to the path selector 340, and the computing context information Info_context and the computing resource information Info_resource according to embodiments are not limited to the above-described examples and may include various types of other information.

The memory allocator 350 may select memories for storing information about inputs/outputs of sub-requests divided by the path selector 340 and allocate the memories to the respective sub-requests. Each piece of hardware may access one or more memories, and memory costs needed to access the memories may have different values from one another. The memory allocator 350 may allocate memories to the respective sub-requests with reference to the link information Link_Info 351 pertaining to the sub-requests divided by the path selector 340 and memory cost information. For example, the memory allocator 350 may generate, for each sub-request, a memory list including information indicating locations of memories where inputs are stored and locations of memories where outputs are to be stored.

For example, it is assumed below that, when a request is divided into first to third sub-requests, operations of the first to third sub-requests are sequentially executed, and a second sub-request, which includes operations that are not supported by dedicated hardware, is executed by general-purpose hardware. The dedicated hardware may receive an input from a memory designated by a memory list, generate a result of an operation of the first sub-request by using the received input, and output the result of the operation in a memory (e.g., a first memory) designated by the memory list. Furthermore, the general-purpose hardware may receive an input (or the result of the operation of the first sub-request) from the first memory designated by the memory list, generate a result of an operation of the second sub-request by using the received input, and store an output, which is a result of the operation, in a memory (e.g., a second memory) designated by the memory list. Similarly, the dedicated hardware may receive an input by accessing the second memory and store a result of an operation of a third sub-request in a memory (e.g., a third memory) designated by the memory list.

On the other hand, since the first sub-request and the third sub-request are executed by the same dedicated hardware, the first memory and the second memory may correspond to a same memory. When the first sub-request is performed by first dedicated hardware and the third sub-request is performed by different second dedicated hardware, a memory providing a minimum memory cost between the first dedicated hardware and the general-purpose hardware may be different from a memory providing a minimum memory cost between the second dedicated hardware and the general-purpose hardware. In other words, the first memory and the second memory may be different types of memory.

Figure 6A:
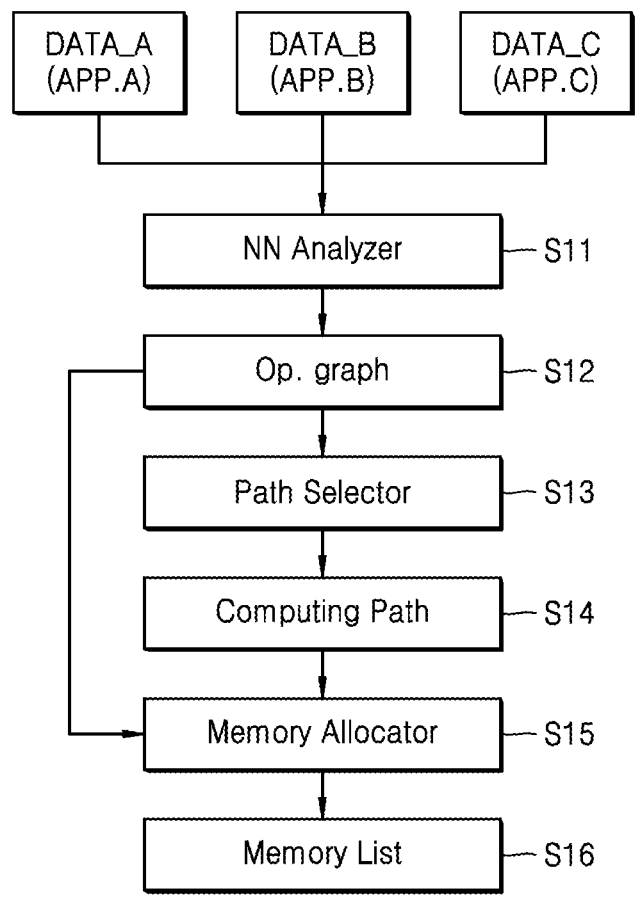
FIGS. 6A, 6B, and 7 are flowcharts of a method of operating a neural network system, according to embodiments.
Figure 6B:
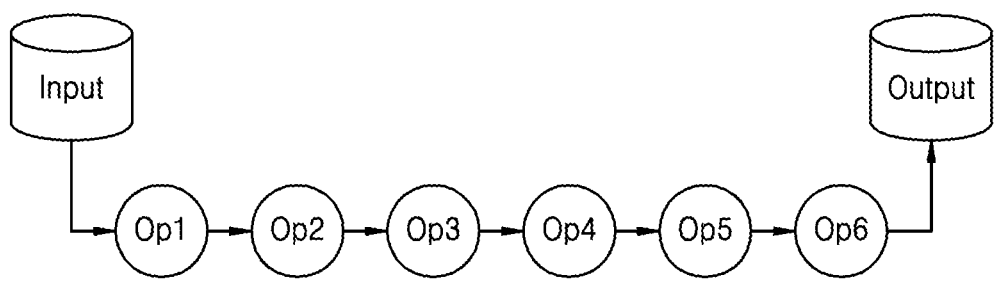
Figure 7:
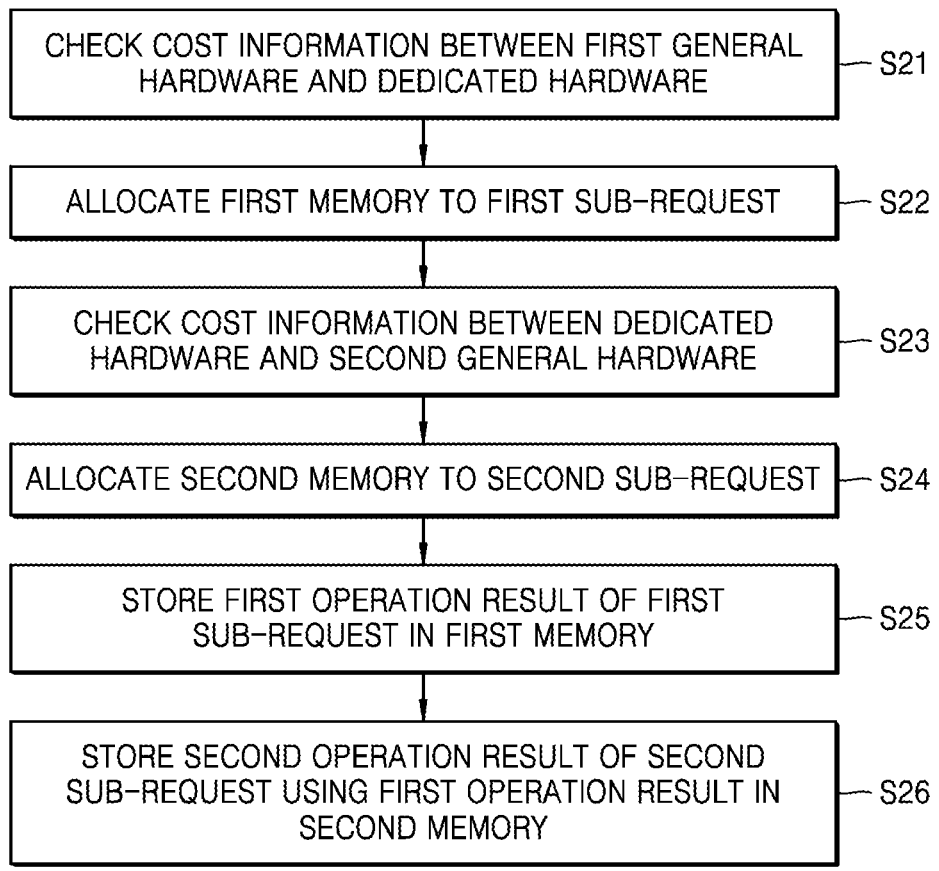

FIGS. 6A, 6B, and 7 are flowcharts of a method of operating a neural network system, according to embodiments.

Referring to FIG. 6A, various types of applications APP.A through APP.C are executed, and requests for operations of a neural network may be issued by the applications APP.A through APP.C. For example, data DATA_A through DATA_C related to operations of a neural network may be provided by the respective applications APP.A through APP.C to the network analyzer in the above embodiments. The neural network analyzer may analyze the overall structures of operations based on the data DATA_A through DATA_C provided from the applications APP.A through APP.C and provide the a result of the analysis (operation S11). For example, the neural network analyzer may generate graph information indicating the overall structure of the operations based on data from the respective applications (operation S12) and, at the same time, provide information indicating operations executable by respective pieces of hardware. FIG. 6B shows an of graph information that may be generated by the neural network analyzer, and the overall operation structure for processing a neural network may be determined through the graph information.

The graph information, generated as a result of the analysis of a neural network as described above, may be provided to a path selector. The path selector may divide a request into a plurality of sub-requests including a plurality of operations according to the above-described embodiments and select a plurality of pieces of hardware for executing the sub-requests (operation S13). For example, the path selector may perform a dividing operation based on information from the neural network analyzer, and static and dynamic information about a plurality of pieces of hardware and may schedule executions of the sub-requests by the hardware. Accordingly, the path selector may generate operation path (computing path) information indicating allocation of the sub-requests to the hardware (operation S14).

Meanwhile, a memory allocator may perform a memory allocation operation by using the graph information from the neural network analyzer and the operation path information from the path selector (operation S15). For example, according to the above-described embodiments, the memory allocator includes link information having information about memory costs between various types of hardware and memories and may generate a memory list including information about memories corresponding to the respective sub-requests (operation S16). Through the above operations, the sub-requests are allocated to hardware optimized for respective operations, and memory costs for executing the respective sub-requests may be minimized. Furthermore, according to the embodiment described above, the memory costs may be minimized by storing results of operations in a memory that may be shared by the hardware without performing data copying for transferring the results of the operations through the hardware.

Meanwhile, FIG. 7 shows an of a memory selected based on a memory allocation operation.

Referring to FIG. 7, first through third sub-requests may be generated through the dividing operation described above, and the first through third sub-requests may be sequentially executed. Also, a first sub-request may be allocated to first general-purpose hardware, a second sub-request may be allocated to dedicated hardware, and a third sub-request may be allocated to second general-purpose hardware.

The memory allocator may check memory cost information for various memories between the first general-purpose hardware and the dedicated hardware by referring to link information (operation S21), determine a first memory having a minimum memory cost according to a result of the check, and allocate the first memory to the first sub-request (operation S22). Similarly, the memory allocator may check information about memory costs between the dedicated hardware and the second general-purpose hardware by referring to the link information (operation S23), determine a second memory having a minimum memory cost according to a result of the check, and allocate the second memory to the second sub-request (operation S24).

When a memory allocation operation as described above is completed, executions of the sub-requests are started, and the first general-purpose hardware may store a result of an operation of the first sub-request in the first memory (operation S25) allocated thereto. Also, the dedicated hardware may read a result of an operation from the first memory, execute the second sub-request by using the same, and store a result of an operation of the second sub-request in the second memory allocated thereto (operation S26). The second general-purpose hardware may be able to execute the third sub-request by using a result of an operation stored in the second memory.

Figure 8:
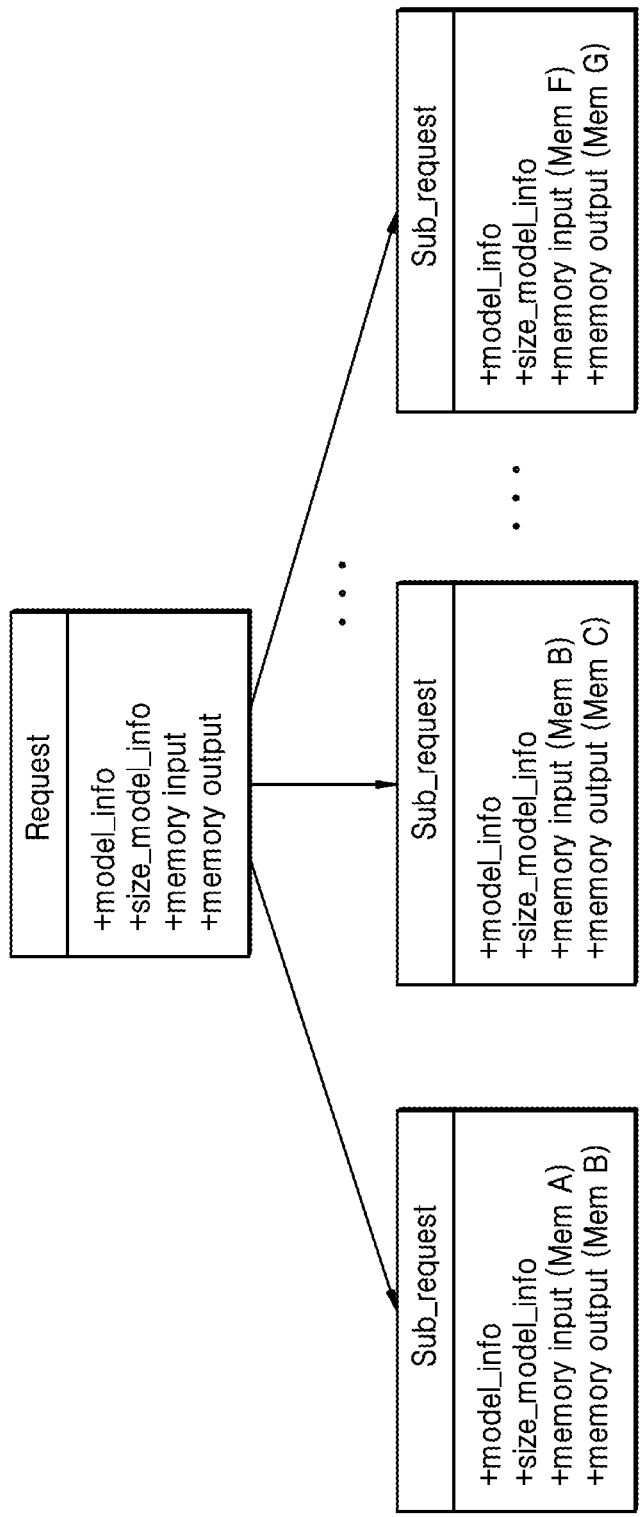
FIG. 8 is a diagram showing an of operation of a path selector in a neural network system according to an embodiment.

FIG. 8 is a diagram showing an of operation of a path selector in a neural network system according to an embodiment.

Referring to FIG. 8, a request of a neural network may include various information (e.g., request information) according to a certain data structure. For example, the request information includes neural network model information model_info, neural network model size information size_model_info, input memory information memory input, and output memory information memory output. For example, when the request of the neural network is executed, input data of the neural network may be provided from a memory designated by the input memory information memory input, and output data of the neural network nay be stored in the memory designated by the output memory information memory output.

According to a selection of an operation path by the path selector described above, a plurality of pieces of sub-request information may be generated from the request information. When the request is divided into N sub-requests, N pieces of sub-request information may be generated from the request information. For example, the data structure of the sub-request information may be identical to the data structure of the request information, and some values of information included in the data structure may be changed. For example, the neural network model information model_info in the sub-request information may be identical to the neural network model information model_info in the request information. On the other hand, the neural network model size information size_model_info, the input memory information memory input, and the output memory information memory output in the sub-request information may be different from those in the request information due to the operation for dividing a request into sub-requests and the memory allocation operation as described above.

Figure 9:
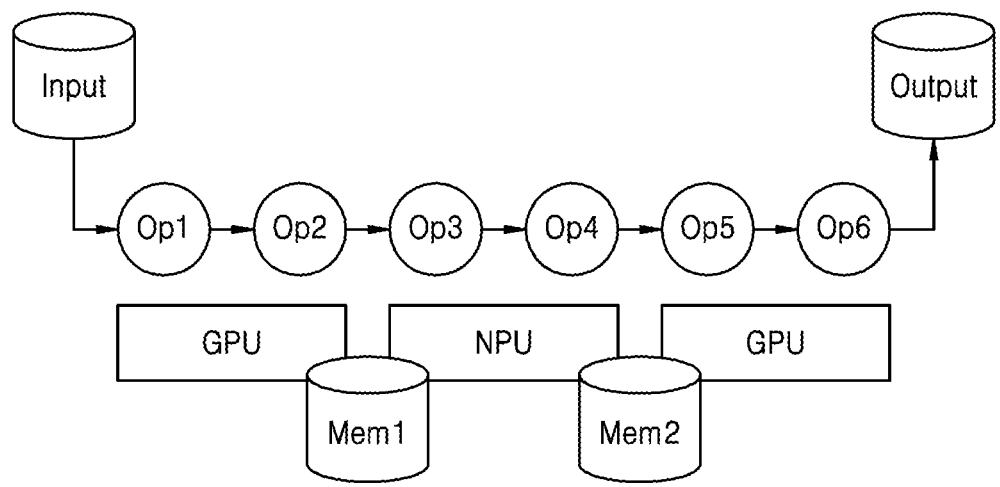
FIG. 9 is a diagram showing an in which hardware is allocated to sub-requests based on the path selector in FIG. 8.

FIG. 9 is a diagram showing an in which hardware is allocated to sub-requests based on the path selector in FIG. 8.

Referring to FIG. 9, a plurality of operations (e.g., six operations) may be executed by using input data read out from a memory designated by request information for a request according to a neural network, and a result of the execution may be stored in a memory designated by the request information. At this time, it is assumed that the request is divided into three sub-requests, first and second operations op1 and op2 included in a first sub-request are executed by a GPU (i.e., general-purpose hardware), third and fourth operations op3 and op4 included in a second sub-request are executed by an NPU (i.e., dedicated hardware), and fifth and sixth operations op5 and op6 included in a third sub-request are executed by the GPU.

Graph information from a neural network analyzer and path selection information from a path selector as shown in FIG. 9 may be provided to a memory allocator according to the embodiments described above, and the memory allocator may include a memory for storing results of operations of the first sub-request executed by the GPU and a memory for storing results of operations of the second sub-request executed by the NPU.

Figure 10A:
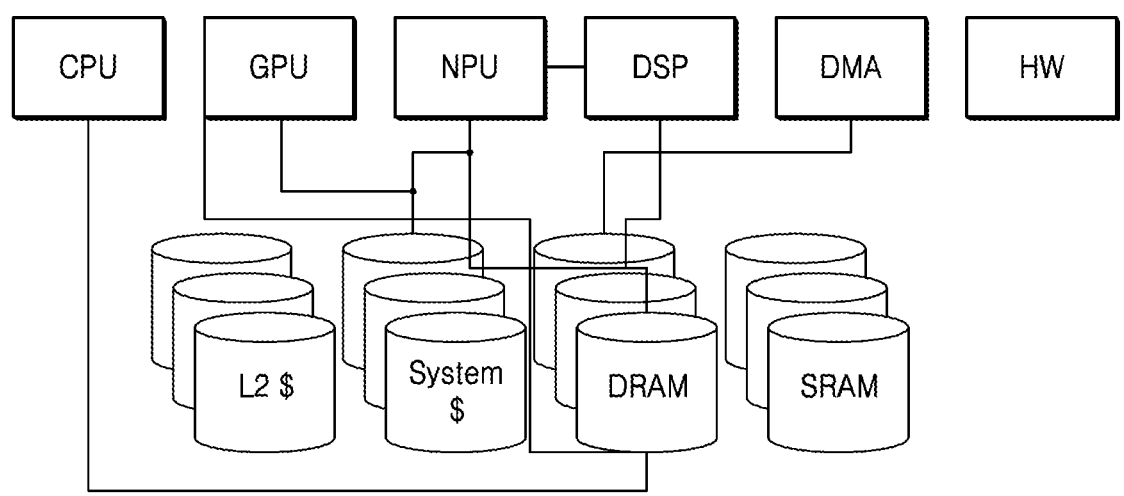
FIGS. 10A, 10B, and 10C are diagrams showing an of a memory allocation operation according to embodiments.
Figures 10B, 10C:
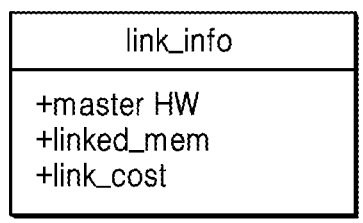

FIGS. 10A, 10B, and 10C are diagrams showing an of a memory allocation operation according to embodiments.

FIG. 10A shows connection states of memories in an electronic system including a neural network system. For example, various types of hardware (e.g., a CPU, a GPU, an NPU, a DSP, a DMA, a HW, etc.) capable of executing neural network operations may be provided in an electronic system, and various types of memories (e.g., L2 cache, system cache, DRAM, SRAM, etc.) may be accessed by the various types of hardware. The connection structure shown in FIG. 10A is merely an example. In an electronic system, memories may be connected in various structures, and thus memory cost information may be set differently for each system.

On the other hand, FIG. 10B shows an of link information included in the memory allocator, and FIG. 10C shows values of the link information. Referring to FIG. 10B, the memory allocator may include a plurality of pieces of link information according to a plurality of pieces of hardware and a plurality of memories, and each piece of link information may include hardware information master HW, memory information linked to the hardware linked_mem, and cost information link_cost between the hardware and the memory. As described above, a memory cost for accessing a memory may include various factors like a memory size, a latency, a bandwidth, and power consumption, and the cost information link_cost may be a value calculated based on a combination of the various factors. Alternatively, the link information may be implemented, such that the cost information link_cost has separate information corresponding to each of the various elements.

Meanwhile, FIG. 10C shows various examples of values of the link information, and the values of the link information shown in FIG. 10C are merely arbitrary values regardless of the structure shown in FIG. 10A. Referring to FIG. 10C, depending on a memory connection structure, hardware may have different memory costs for various types of memories. For example, in FIG. 10C, the smaller the value of a memory cost is, the easier the corresponding memory may be accessed due to less power consumption or a small latency. On the other hand, the greater the value of a cost value is, the harder the corresponding memory may be accessed.

Referring to a CPU corresponding to general-purpose hardware, as the CPU and a GPU are directly connected to each other through a bus, data may be directly transmitted and received between the CPU and the GPU. In this case, the CPU may have a smallest memory cost (e.g., 0) for the GPU. For example, as the CPU may access a buffer (or a cache) in the GPU or the GPU may access a buffer in the CPU, the memory cost between the CPU and the GPU may have a minimum value. On the other hand, the CPU may have a memory cost of 1 for system cache and a memory cost of 3 for DRAM. In other words, the CPU may directly exchange data with the GPU for smaller memory cost as compared to memory costs for accessing system cache or DRAM.

Similarly, the GPU may have the smallest memory cost (e.g., 0) for the CPU, the memory cost for the system cache may be 1, the memory cost for a high bandwidth memory (HBM) may be 2, and the memory cost for the DRAM may be 3. As dedicated hardware, an NPU may have a memory cost of 0 for a DSP, which is general-purpose hardware, a memory cost of 1 for SRAM, and a memory cost of 3 for the DRAM. Furthermore, the DSP may have a memory cost of 0 for the NPU and a memory cost of 1 for the SRAM.

The memory allocator may allocate an optimized memory to each sub-request using link information that may be implemented as described above. When one of requests is divided into three sub-requests and the three sub-requests are performed sequentially by the NPU, the DSP, and the NPU, a memory having the minimum memory cost between the NPU and the DSP may be selected. For example, in the of FIG. 10C, when the DSP may access a buffer in the NPU, a result of an operation in the NPU may be stored in the buffer included in the NPU and a result of an operation in the DSP may be stored in the buffer provided inside the NPU.

Although FIG. 10C exemplifies only some types of memories, embodiments are not limited thereto. For example, the memory allocator may further include memory cost information between various other types of hardware and various other types of memory, like a storage, a remote storage, a remote direct memory access (RDMA), a memory server, and MemCache.

Figure 11:
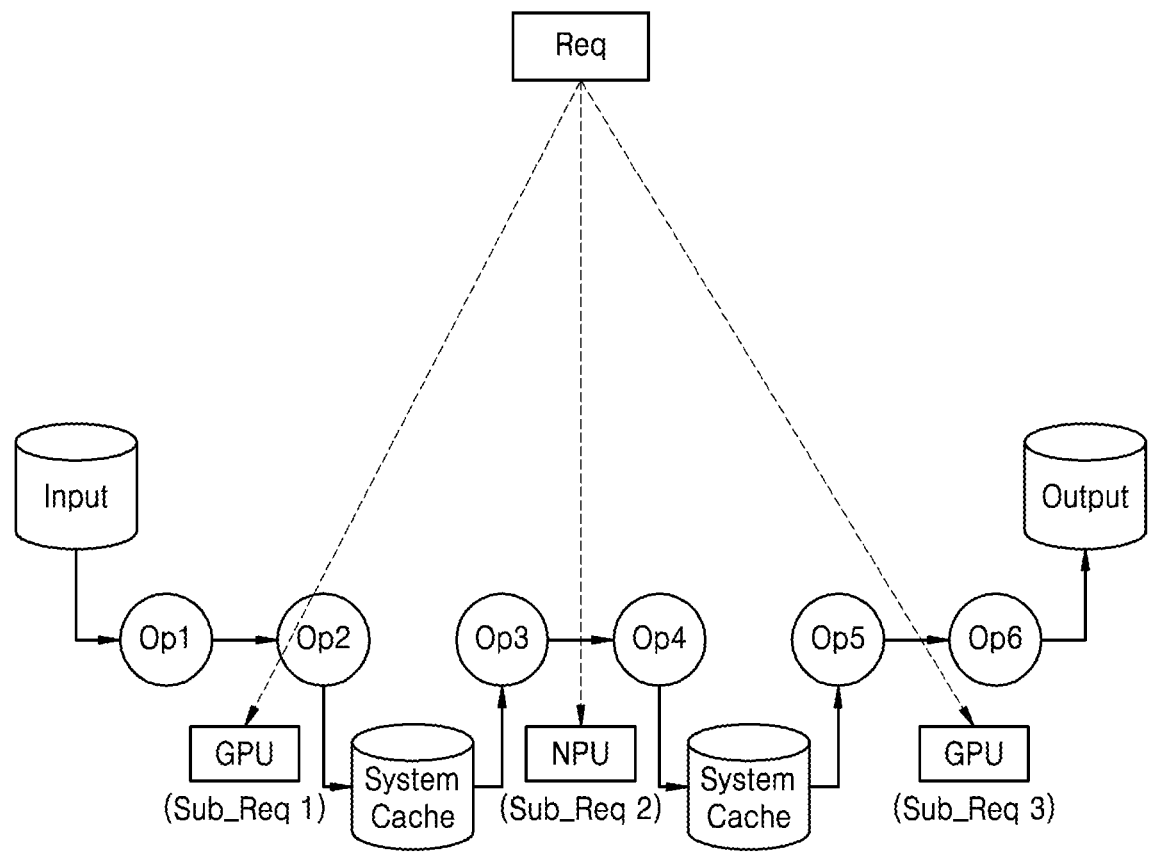
FIG. 11 is a diagram showing an in which a neural network is executed after an operation allocation management operation is completed according to embodiments.

FIG. 11 is a diagram showing an in which a neural network is executed after an operation allocation management operation is completed according to embodiments.

Referring to FIG. 11, one request for processing a neural network is divided into a plurality (e.g., three) of sub-requests Sub_Req 1 through Sub_Req 3. A first sub-request is executed by a GPU based on an input read out from a memory designated by the request, and a result of an operation thereof (e.g., a result of a second operation op2) may be stored in system cache having a relatively small memory cost between the GPU and an NPU. Also, a second sub-request is executed by the NPU based on data stored in system cache, and a result of an operation thereof (e.g., a result of a fourth operation op4) may be stored in the system cache. Also, a third sub-request is executed by the GPU based on data stored in the system cache, and a final operation result (e.g., a result of a sixth operation op6) may be stored in a memory designated by the request.

Figure 12:
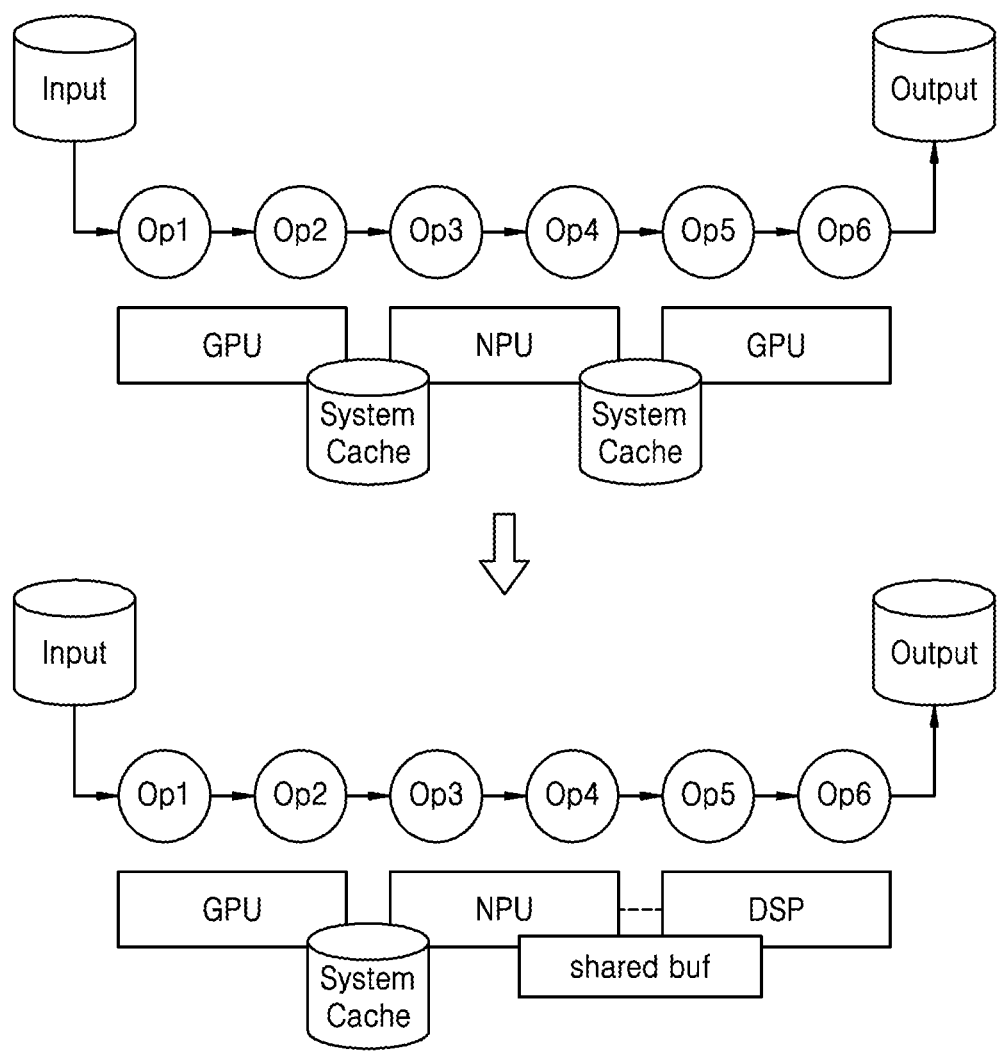
FIG. 12 is a schematic diagram showing an of the operation of a neural network system according to a modifiable embodiment.

FIG. 12 is a schematic diagram showing an of the operation of a neural network system according to a modifiable embodiment. FIG. 12 shows an in which hardware for executing a sub-request is changed in real time by using dynamic information.

Referring to FIG. 12, a request including a plurality of operations op1 through op6 may be divided into a plurality of sub-requests. For example, the request may be divided into a first sub-request including first and second operations opt and op2, a second sub-request including third and fourth operations op3 and op4, and a third sub-request including fifth and sixth operations op5 and op6. It is assumed that the first and third sub-requests are allocated to a GPU, which is general-purpose hardware, and the second sub-request is allocated to an NPU, which is dedicated hardware. Furthermore, as system cache is selected through a memory allocation operation, it is assumed that results of operation results of the first sub-request and the second sub-request are stored in the system cache.

According to an embodiment, it may be assumed that the NPU, which is dedicated hardware, has a minimum memory cost for a DSP, which is general-purpose hardware. On the other hand, an operation allocating manager (or a path selector) may select paths of hardware to perform operations based on various information like static information and dynamic information, and, as the DSP having a minimum memory cost for the NPU is taken and used by another device like a camera, other general-purpose hardware (e.g., a GPU) may be allocated instead of the DSP.

While operations according to the sub-requests are being executed, as an operation for which the DSP is used by another device is terminated, the operation allocating manager may determine that the third sub-request may be better executed by the DSP. Furthermore, since a memory having a minimum memory cost between the NPU and the DSP may be determined and it may be determined that there is a buffer shared between the NPU and the DSP, the buffer may be selected as a memory for storing an operation result of the second sub-request (or input data of the third sub-request).

According to the real-time allocation operation of the operation allocating manager as described above, the NPU may execute the second sub-request including the third and fourth operations op3 and op4 and store operation results thereof in a buffer (e.g., a buffer provided in the DSP). Furthermore, the DSP may execute the third sub-request including the fifth and sixth operations op5 and op6 by using operation results stored in the buffer therein and generate operation results of the third sub-request.

On the other hand, the embodiment shown in FIG. 12 may also be described by operations below.

For example, as the GPU that may perform data access with a minimum memory cost to the NPU is selected, the third sub-request may be allocated to the GPU. The operation allocating manager may determine based on dynamic information that other tasks like graphics processing has been allocated to the GPU, and thus the operation allocating manager may select the DSP, which has a relatively small (or the smallest) memory cost from among the remaining general-purpose hardware, and allocate the DSP to the third sub-request. Accordingly, the DSP may execute the third sub-request by using operation results of the second sub-request stored in a memory newly allocated by the memory allocator.

Figure 13A:
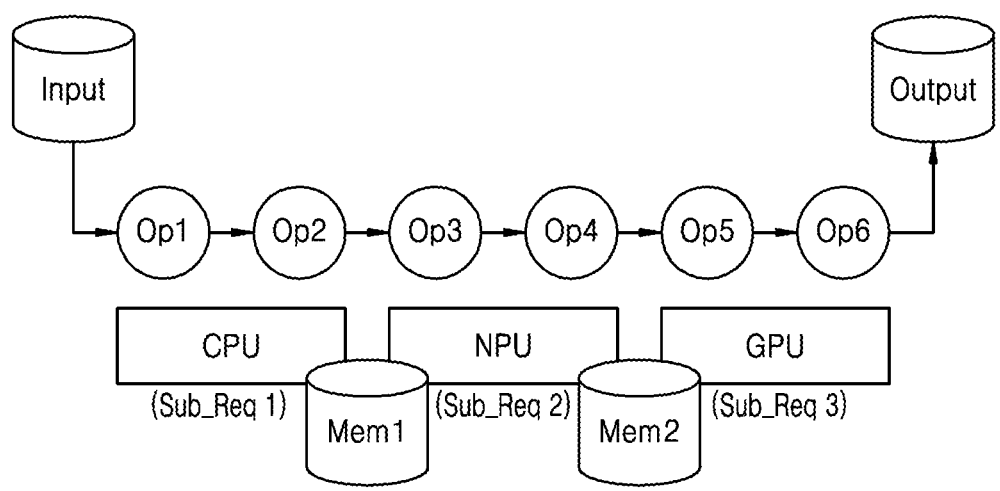
FIGS. 13A and 13B are block diagrams showing operation allocation management operations according to various embodiments.
Figure 13B:
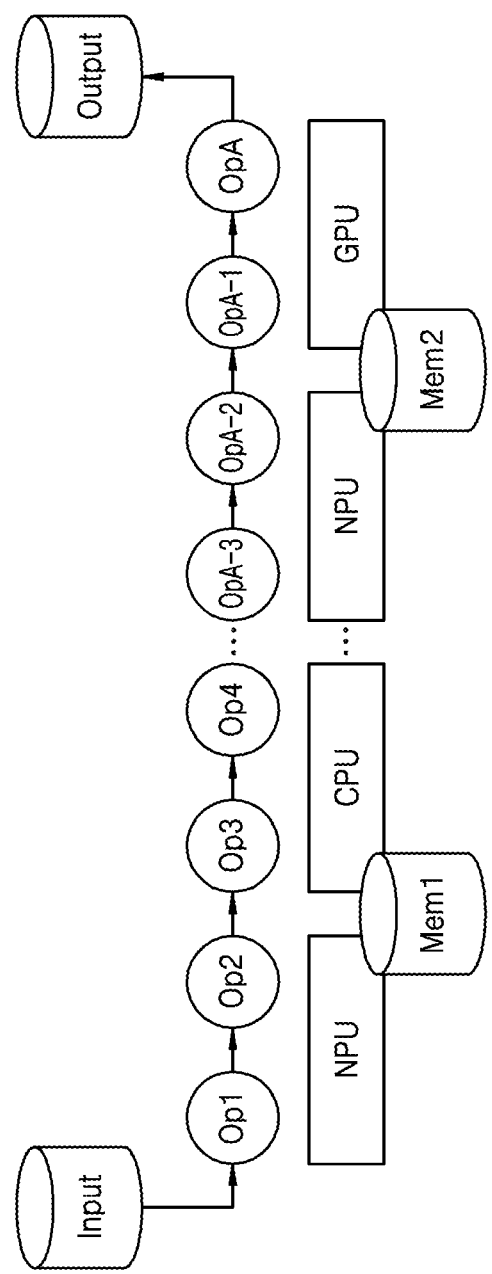

FIGS. 13A and 13B are block diagrams showing operation allocation management operations according to various embodiments. FIG. 13A shows an in which dedicated hardware (e.g., an NPU) accesses different memories for inputting and outputting processes when executing a sub-request, and FIG. 13B shows an in which, when dedicated hardware executes a plurality of sub-requests, the dedicated hardware accesses different memories for the respective sub-requests.

Referring to FIG. 13A, a CPU, as first general-purpose hardware, may execute a first sub request Sub_Req 1, an NPU may subsequently execute a second sub request Sub_Req 2, and a GPU, as second general-purpose hardware, may execute a third sub-request Sub_Req 3. At this time, a first memory Mem 1 may have a minimum memory cost between the NPU and the CPU, and a second memory Mem 2 may have a minimum memory cost between the NPU and the GPU. Accordingly, the NPU may access an input for execution of the second sub-request Sub_Req 2 from the first memory Mem 1, and the NPU may store a result of executing the second sub-request Sub_Req 2 to a second memory Mem 2 different from the first memory Mem 1.

Meanwhile, referring to FIG. 13B, from among the plurality of sub-requests, two or more sub-requests may be allocated to and executed by the NPU. For example, an in which the NPU executes the first sub-request Sub_Req 1 and an (A−1)-th sub-request Sub_Req A−1 is shown. Furthermore, operation results of the first sub request Sub_Req 1 of the NPU may be provided to the CPU, and operation results of the (A−1)-th sub-request Sub_Req A−1 may be provided to the GPU.

For executing each sub-request, the NPU may access operation inputs from different memories and store operation results in different types of memories. For example, as the first memory Mem 1 has a minimum memory cost between the NPU and the CPU and the second memory Mem 2 has a minimum memory cost between the NPU and the GPU, the NPU may store operation results of the first sub-request Sub_Req 1 in the first memory Mem 1 and store operation result of the (A−1)-th sub-request Sub_Req A−1 in the second memory Mem 2.

Figure 14:
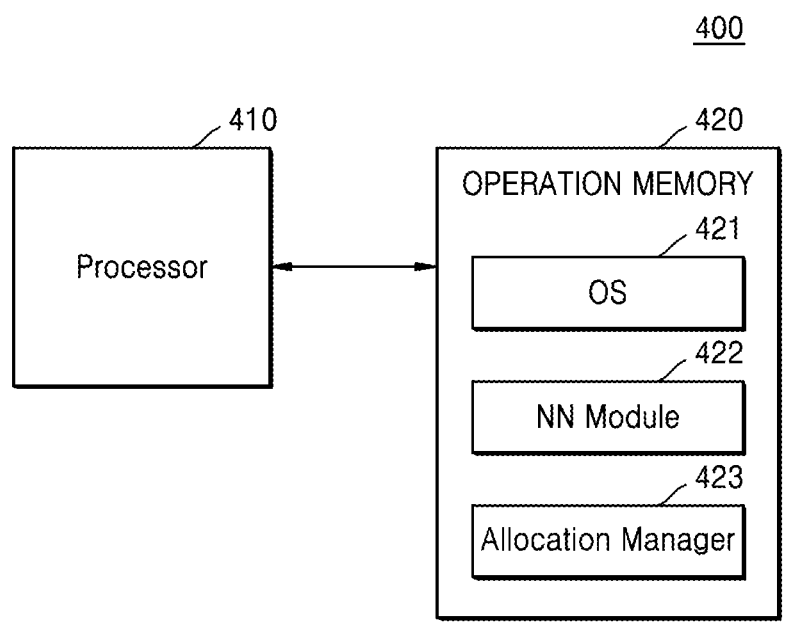
FIG. 14 is a block diagram showing an in which an operation allocating manager according to an embodiment is implemented in software.

FIG. 14 is a block diagram showing an in which an operation allocating manager according to an embodiment is implemented in software. A system shown in FIG. 14 may be an application processor 400, and the application processor 400 is a semiconductor chip and may be implemented as a system-on-chip (SoC).

The application processor 400 may include a processor 410 and an operation memory 420 (otherwise known as main memory, internal memory, or primary storage). Also, the application processor 400 may further include one or more intellectual property (IP) modules connected to a system bus. The operation memory 420 may store software like various programs and commands related to operations of a system in which the application processor 400 is employed, e.g., an operating system 421, a neural network module 422, and an allocating manager module 423. The processor 410 may execute the allocating manager module 423 loaded into the operation memory 420. According to the embodiments described above, a request may be divided into a plurality of sub-requests, and memories may be allocated to the respective sub-requests.

Meanwhile, operations of a neural network may be executed as one or more pieces of hardware perform the neural network module 422. For example, operations divided into sub-requests according to the embodiments described above may be performed by a plurality of pieces of hardware. For example, a plurality of sub-requests may be executed by the processor 410 shown in FIG. 14, one or more pieces of dedicated hardware, and/or two or more pieces of general-purpose hardware.

Figure 15:
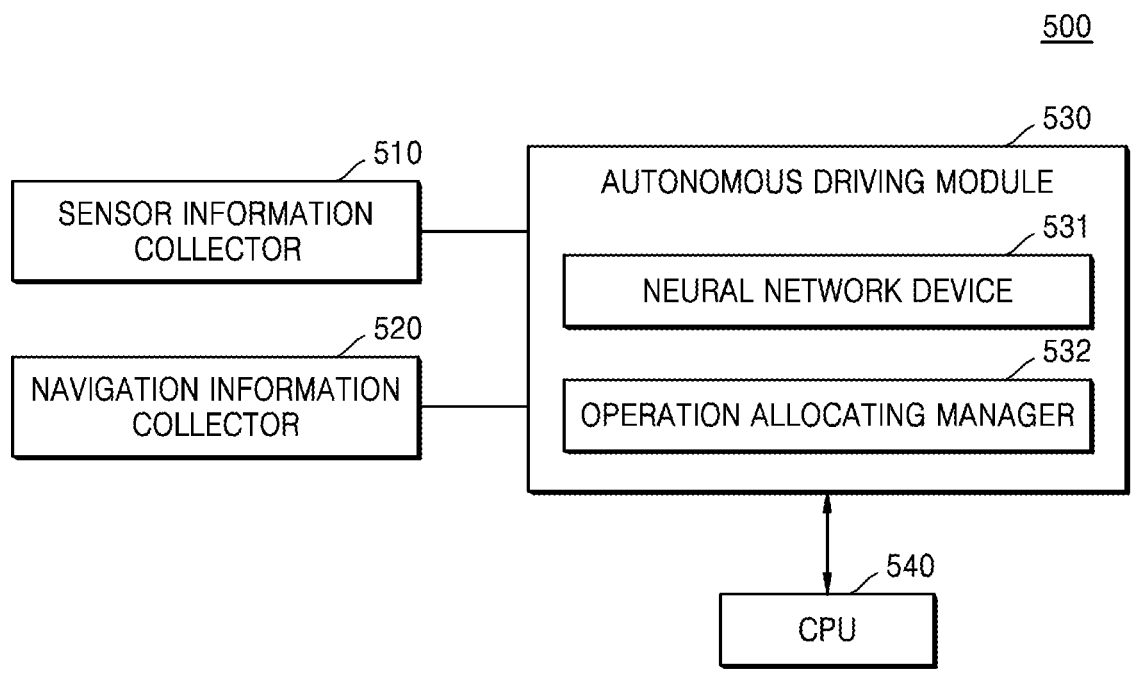
FIG. 15 is a block diagram showing an in which an operation allocating manager according to an embodiment is implemented in an autonomous driving module employed by an automobile.

FIG. 15 is a block diagram showing an in which an operation allocating manager according to an embodiment is implemented in an autonomous driving module employed by an automobile. A system shown in FIG. 15 may correspond to an autonomous driving system 500. The autonomous driving system 500 may include a sensor information collector 510, a navigation information collector 520, an autonomous driving module 530, and a CPU 540. Furthermore, the autonomous driving module 530 may include a neural network device 531 and an operation allocating manager 532.

The neural network device 531 performs neural network operations using various image information and voice information and may generate information signals, such as an image recognition result and a voice recognition result based on results of the neural network operations. For example, the sensor information collector 510 may include devices capable of collecting various types of image information and voice information, such as a camera and a microphone, and may provide collected information to the autonomous driving module 530. Furthermore, the navigation information collector 520 may provide various types of information (e.g., location information, etc.) related to driving a vehicle to the autonomous driving module 530. For example, the navigation information collector 520 may be a global positioning system (GPS) device. The neural network device 531 may generate the information signals by executing various types of neural network models by using information from the sensor information collector 510 and/or the navigation information collector 520 as inputs thereto.

The operation allocating manager 532 may perform a function for dividing a request into a plurality of sub-requests according to the above-described embodiments and allocating memories to the respective sub-requests. The operation allocating manager 532 may allocate sub-requests for neural network operations to one or more pieces of dedicated hardware and general-purpose hardware that may be provided inside or outside the autonomous driving module 530, and the neural network device 531 may execute operations on a sub-request basis based on the hardware and the memories allocated above.

According to a neural network system, an application processor including the neural network system, and a method of operating the neural network system according to the present disclosure, an operating system does not need to perform processing for allocating neural network operations to a plurality of pieces of hardware, and operations not supported by dedicated hardware may be efficiently allocated to general-purpose hardware at a level (e.g., abstraction level or layer) below the operating system.

Also, according to a neural network system, an application processor including the neural network system, and a method of operating the neural network system according to the present disclosure, optimal allocation of memories to respective sub-requests based on memory costs may be achieved, waste of resource during memory copying operations may be minimized, and the efficiency of neural network operations may be improved through faster memory access.

Furthermore, according to a neural network system, an application processor including the neural network system, and a method of operating the neural network system according to the present disclosure, since memories may be allocated and used based on various costs such as power consumption, the power efficiency of a system for executing neural network operations may be improved.

As described above, embodiments have been disclosed in the drawings and specification. Although embodiments have been described herein using specific terminology, it is understood that they have been used only for purposes of describing the relevant concepts and not for limiting the scope of the present disclosure as defined in the claims. Therefore, one of ordinary skill in the art will appreciate that various modifications and equivalent embodiments are possible without departing from the scope of the present disclosure. Accordingly, the true scope of protection should be determined by the technical idea of the appended claims.

What is claimed is:

1. A neural network system comprising:
an operation allocating manager configured to:
divide a request comprising a plurality of operations for neural network processing into a plurality of sub-requests each including at least one operation,
allocate the plurality of sub-requests to dedicated hardware and one or more pieces of general-purpose hardware, and
allocate memories for input and output for each of the plurality of sub-requests based on cost information indicating respective costs needed for the dedicated hardware and the one or more pieces of general-purpose hardware to access the memories; and
a neural network device configured to execute the plurality of sub-requests by using the dedicated hardware and the one or more pieces of general-purpose hardware according to a result of the allocating the plurality of sub-requests and the allocating the memories by the operation allocating manager,
wherein the operation allocating manager is further configured to allocate different memories to at least two sub-requests of the plurality of sub-requests.

2. The neural network system of claim 1, wherein the plurality of sub-requests comprise a first sub-request and a second sub-request that are sequentially executed, wherein the first sub-request is allocated to first general-purpose hardware, and the second sub-request is allocated to the dedicated hardware, and
wherein a result of the first sub-request from the first general-purpose hardware is provided as an input of the second sub-request via an internal buffer provided in at least one of the dedicated hardware and the first general-purpose hardware.

3. The neural network system of claim 1, wherein the plurality of sub-requests comprise a first sub-request, a second sub-request, and a third sub-request that are sequentially executed,
wherein the first sub-request is allocated to first general-purpose hardware, the second sub-request is allocated to the dedicated hardware, and the third sub-request is allocated to second general-purpose hardware, and
wherein a first memory is allocated to the first sub-request and a second memory is allocated to the second sub-request, based on the cost information, the second memory being different from the first memory.

4. The neural network system of claim 1, wherein the plurality of operations included in the request comprise a first group of operations executable by the dedicated hardware and a second group of operations not executable by the dedicated hardware, and
wherein the operation allocating manager comprises:
a path selector configured to allocate a first sub-request including the first group of operations to the dedicated hardware and allocate a second sub-request including the second group of operations to the one or more pieces of general-purpose hardware; and
a memory allocator configured to allocate the memories to store operation results of the plurality of sub-requests based on the cost information of the dedicated hardware and the one or more pieces of general-purpose hardware regarding the memories.

5. The neural network system of claim 4, wherein the operation allocating manager further comprises:
a neural network analyzer configured to generate graph information indicating operation structures of the plurality of operations included in the request, and
wherein the path selector is further configured to allocate the dedicated hardware and the one or more pieces of general-purpose hardware based on the graph information.

6. The neural network system of claim 5, wherein the memory allocator is further configured to allocate the memories to respective sub-requests based on (i) the graph information generated by the neural network analyzer, (ii) a result of allocations by the path selector, and (iii) the cost information of the dedicated hardware and the one or more pieces of general-purpose hardware regarding the memories.

7. A method of operating a neural network system, the method comprising:
dividing, via a processor, a request comprising a plurality of operations for neural network processing into a plurality of sub-requests each including at least one operation;
allocating, via the processor, a first group of operations of the plurality of sub-requests to dedicated hardware, the first group of operations being executable by the dedicated hardware;
allocating, via the processor, a second group of operations of the plurality of sub-requests to one or more pieces of general-purpose hardware;
allocating, via the processor, memories to the plurality of sub-requests based on cost information indicating respective costs needed for the dedicated hardware and the one or more pieces of general-purpose hardware to access the memories; and
executing the plurality of sub-requests by accessing the allocated memories by the dedicated hardware and the selected one or more pieces of general-purpose hardware.

8. The method of claim 7, wherein the dividing comprises categorizing the first group of operations and the second group of operations into different sub-requests.

9. The method of claim 8, wherein at least one piece of general-purpose hardware from among the one or more pieces of general-purpose hardware in the neural network system is selected to execute one or more sub-requests including the second group of operations.

10. The method of claim 8, wherein two or more pieces of general-purpose hardware from among the one or more pieces of general-purpose hardware in the neural network system are selected to execute the plurality of sub-requests including the second group of operations.

11. The method of claim 7, wherein the plurality of sub-requests comprise a first sub-request and a second sub-request that are sequentially executed, wherein the first sub-request is executed by the dedicated hardware, and the second sub-request is executed by first general-purpose hardware, and
wherein the allocating the memories comprise allocating a memory, having a lowest cost, from among the memories, for access by the dedicated hardware and the first general-purpose hardware, to the first sub-request.

12. The method of claim 7, wherein the cost information comprises at least one of a memory size, a write/read latency, a bandwidth, and power consumption.

13. The method of claim 7, wherein a type of memories allocated to the plurality of sub-requests is variable according to the cost information.

14. The method of claim 7, wherein the plurality of sub-requests comprise a first sub-request, a second sub-request, and a third sub-request that are sequentially executed, the first sub-request is executed by first general-purpose hardware, the second sub-request is executed by the dedicated hardware, and the third sub-request is executed by second general-purpose hardware, and wherein a first memory is allocated to the first sub-request and a second memory is allocated to the second sub-request, according to the cost information.

15. The method of claim 14, wherein, from among the memories, the first memory is selected for having a lowest cost for access by the first general-purpose hardware and the dedicated hardware is selected as the first memory, and the second memory is selected for having a lowest cost for access by the dedicated hardware and second general-purpose hardware.

16. The method of claim 7, wherein the allocating the second group of operations to the one or more pieces of general-purpose hardware comprises selecting at least one piece of general-purpose hardware from among the one or more pieces of general-purpose hardware by using at least one of context information and resource information of the one or more pieces of general-purpose hardware.

17. An application processor comprising:
a memory configured to store a program;
a processor configured to execute the program stored in the memory; and
an operation allocating manager comprising the program loadable into the memory,
wherein the processor is further configured to, by executing the operation allocating manager:
divide a request including a plurality of operations for neural network processing into a plurality of sub-requests each including at least one operation,
select dedicated hardware and one or more pieces of general-purpose hardware for executing the plurality of sub-requests, and
allocate memories to the plurality of sub-requests based on cost information indicating respective costs for the dedicated hardware and the one or more pieces of general-purpose hardware to access the memories.

18. The application processor of claim 17, further comprising:
a neural network device comprising the dedicated hardware and the one or more pieces of general-purpose hardware,
wherein the neural network device is configured to execute the plurality of sub-requests through input/output operations using the memories allocated to each of the plurality of sub-requests.

19. The application processor of claim 17, wherein the operation allocating manager further comprises:
a computing context module configured to provide context information related to dynamic information of the dedicated hardware and the one or more pieces of general-purpose hardware, and
a computing resource module configured to provide resource information related to operation characteristics of the dedicated hardware and the one or more pieces of general-purpose hardware, and
wherein the one or more pieces of general-purpose hardware for executing the plurality of sub-requests is selected by using at least one of the context information and the resource information.

20. The application processor of claim 17, wherein the operation allocating manager is configured to generate a memory list regarding the one or more pieces of general-purpose hardware, the memory list comprising link information about the cost information of the dedicated hardware and the one or more pieces of general-purpose hardware for the memories and information about memories allocated to the plurality of sub-requests.

* * * * *